United States Patent
Tijerina et al.

(10) Patent No.: US 9,501,923 B2
(45) Date of Patent: Nov. 22, 2016

(54) DISTRESS IDENTIFIER TO CAUSE AN ACTION

(71) Applicant: PAYPAL, INC., San Jose, CA (US)

(72) Inventors: Kevin Tijerina, Pflugerville, TX (US); Abraham Doris-Down, Newtonville, MA (US); Miguel Angel Escobedo, Austin, TX (US); Matthew Alexander Wilczynski, Austin, TX (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 14/552,425

(22) Filed: Nov. 24, 2014

(65) Prior Publication Data

US 2016/0148488 A1 May 26, 2016

(51) Int. Cl.
*G06K 15/00* (2006.01)
*G08B 25/00* (2006.01)
*G06Q 20/20* (2012.01)
*G06Q 20/32* (2012.01)
*G06Q 50/26* (2012.01)

(52) U.S. Cl.
CPC ........... *G08B 25/007* (2013.01); *G06Q 20/206* (2013.01); *G06Q 20/327* (2013.01); *G06Q 50/265* (2013.01)

(58) Field of Classification Search
USPC ............... 235/380, 383, 385; 902/14, 20, 39
See application file for complete search history.

(56) References Cited

U.S. PATENT DOCUMENTS

2007/0219928 A1* 9/2007 Madhogarhia .......... G06F 21/32
705/75
2015/0142595 A1* 5/2015 Acuna-Rohter ....... G06Q 20/40
705/21

* cited by examiner

*Primary Examiner* — Daniel St Cyr
(74) *Attorney, Agent, or Firm* — Haynes and Boone, LLP (57) ABSTRACT

Embodiments relate to systems and methods for providing digital dye packs and/or distress signals on a device user interface in connection with a transaction. In an embodiment, a system includes a communication module that interacts with a device having an input device that receives, from a user of the device, specific distress identifier information in connection with conducting a transaction via the device. The system also includes a non-transitory memory comprising a database storing specific distress identifier information with corresponding defensive actions that are executed based on the specific distress identifier information. The system further includes at least one hardware processor in communication with the non-transitory memory and the communication module for executing the defensive actions corresponding to the specific distress identifier information based at least in part on the specific distress identifier information received from the user of the device in connection with the transaction.

20 Claims, 5 Drawing Sheets

| Regular or Original Identifier 202 | Specific Identifier (modified or alternate identifier or gesture) 204 | Assigned Action to Specific Identifier Pursuant to Pre-Agreement 206 |
|---|---|---|
| Password is "CAT" | 123CAT (add prefix) | Alert for transaction to be flagged and tracked |
| CAT | CAT123 (add suffix) | Limit transaction pursuant to pre-agreement (e.g., amount to $500, time to one week, location to within 30 miles, etc.) |
| CAT | DOG (alternate password) | Limit display of information (e.g., "Total available funds is $20," and/or no personal information) |
| CAT | CAT^^123(^^is pause) (Pattern using thumb instead of finger) | Distress signal (e.g., alert authorities, limit accessibility, lockdown apps, turn on location tracking and/or camera, etc.) |
| | | |
| User Name is "JDOE" | JDE (subtract digit or character) | Alert for transaction to be flagged and tracked |
| JDOE | JDOEP4 (add suffix for subaccount) | Pull funds for transaction from a subaccount |
| JDOE | JDOE (extra pressure on bold "D") plus a hand gesture (e.g., a fist) (add gesture) | Distress signal (e.g., alert authorities, limit accessibility, lockdown apps, turn on location tracking and/or camera, etc.) |

FIG. 1

| Regular or Original Identifier 202 | Specific Identifier (modified or alternate identifier or gesture) 204 | Assigned Action to Specific Identifier Pursuant to Pre-Agreement 206 |
|---|---|---|
| Password is "CAT" | 123CAT (add prefix) | Alert for transaction to be flagged and tracked |
| CAT | CAT123 (add suffix) | Limit transaction pursuant to pre-agreement (e.g., amount to $500, time to one week, location to within 30 miles, etc.) |
| CAT | DOG (alternate password) | Limit display of information (e.g., "Total available funds is $20," and/or no personal information) |
| CAT | CAT^^123(^^is pause) (Pattern using thumb instead of finger) | Distress signal (e.g., alert authorities, limit accessibility, lockdown apps, turn on location tracking and/or camera, etc.) |
| User Name is "JDOE" | JDE (subtract digit or character) | Alert for transaction to be flagged and tracked |
| JDOE | JDOEP4 (add suffix for subaccount) | Pull funds for transaction from a subaccount |
| JDOE | JDOE (extra pressure on bold "D") plus a hand gesture (e.g., a fist) (add gesture) | Distress signal (e.g., alert authorities, limit accessibility, lockdown apps, turn on location tracking and/or camera, etc.) |

# DISTRESS IDENTIFIER TO CAUSE AN ACTION

TECHNICAL FIELD

Embodiments of the present disclosure generally relate to transactions conducted over a device having a user interface, and more specifically, to using a device's user interface to provide specific identifiers or gestures to cause a corresponding action.

BACKGROUND

Currently, users may conduct many types of transactions using various computing devices such as mobile devices, kiosks such as ATMs, etc. In many cases, a user may be required to enter an identifier such as a password or a PIN for identification or security purposes in order to access a user account in connection with a transaction. However, in certain questionable situations, the user may become suspicious of potential threats or misuse of the user's identifiers. For example, the user may suspect potential phishing, or may be weary of a certain website, or a certain ATM location, etc. In these situations, the user may be concerned about using identifiers that may compromise the user's identity or security. Thus, users may not engage in transactions with recipients that are not trusted even when advantageous to them.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to one or more embodiments of the present disclosure, systems and methods are provided for using a user interface of a device to provide specific identifiers to cause a corresponding action. For example, specific identifiers may be used in cases where recipients in a transaction are not trusted, or to transmit a distress signal.

In various embodiments, a user may conduct transactions over a device (e.g., a mobile device, a kiosk such as an ATM, etc.) such as shopping for items, purchasing items, communicating data, applying for loans, depositing or withdrawing funds, etc. In that regard, the device may include specialized hardware and/or software allowing the user to conduct transactions upon entering a user identifier such as a password, a PIN, an account number, a user name, etc. However, in certain questionable situations, the user may not be confident about a recipient of the user's identifier or other user information in connection with the transaction. For example, questionable situations may include situations where the user of a user device becomes suspicious of phishing such as when visiting a website, or where a website or link may not appear to be legitimate, or when a location of an ATM is in a convenience store in an out of the way place, etc. In these types of situations, the user may worry that any information that the user may enter into the device may be leaked and pose a threat to the user's identity or security. As a result, the user may want to send an alert of a transaction's potential risk to a remote server. In an embodiment, the remote server may be implemented by a payment service provider such as PayPal®, Inc., or eBay®, Inc. of San Jose, Calif., USA.

According to various embodiments herein, the device may include an identifier application or module such that, in certain questionable situations, for example where a recipient in a transaction is not trusted, the user may enter a specific identifier such as a modified or alternate identifier or gesture via a user interface of the device. Modified or alternate identifiers or gestures may include a modified password or PIN, a modified account number, a modified user name, a completely different identifier, a specific gesture, etc. For example, the modified or alternate identifiers may include the regular or original identifier such as a password with an added prefix, an added suffix, one or more extra digits or characters embedded therein, one or more digits or characters subtracted therefrom, a set of completely new or different digits, an accompanying gesture, etc. In an embodiment, key stretching may also be used for a modified identifier so that the modified identifiers with extra digits or characters may make automated actions by hackers or other untrusted recipients more difficult.

In an exemplary situation where a user is requested to enter a password or account number for conducting a transaction via a user device (e.g., a mobile device), and the user suspects phishing, the user may enter a modified or alternate identifier via a user interface of the user device. For example, the user's regular password may be modified to include two or three extra numerical digits before or after the original digits of the password.

As a result of the user's entering the specific identifier such as a modified or alternate identifier or gesture via the device's user interface, the device may transmit an alert to a remote server that interacts with the device via respective communications components so that the transaction may be flagged or tracked differently than a transaction where a regular identifier is used due to the high risk designation. In that regard, the remote server may track or monitor activities or processes related to the transaction including timelines, locations, payments, etc. However, the transaction may not otherwise fail. That is, the transaction may proceed normally as long as related processes or activities are normal (e.g., timely payments are made, no misuse of identity is detected, etc.). In cases where processes or activities related to the transaction are not normal, the transaction may be ended or flagged as illegitimate. In an embodiment, the user may request or confirm that an identifier should be invalidated.

As such, in some embodiments, the modified or alternate identifiers may act as digital dye packs that may use embedded data (e.g., another string in block chain) that may be used to track the transaction downstream.

Furthermore, in various embodiments, when a transaction is flagged, the transaction may be bound by certain attributes or low liability limits. That is, attributes or limits may be applied to the transaction such as limiting the transaction to a certain amount of money, or for a limited period of time, or a limited geographical location, or be site specific, etc.

As such, in one or more embodiments, transactions of low confidence may be flagged for tracking purposes due to a high risk designation. That is, embodiments herein allow the user of a device to signal potentially risky transactions such that the user of the device may be empowered to let the remote server know of increased risk with respect to a transaction (although in some situations, it may turn out that the transaction is legitimate).

In various embodiments, there may be a crowd-sourcing aspect relating to the remote server where the remote server receives specific modified identifiers from many users in connection with a particular recipient (i.e., an entity such as a merchant). In this regard, transactions of multiple users may be marked and stored in a database where transaction records may be maintained. Multiple users have a record of transactions due to the specific identifiers acting as digital dye packs described in embodiments herein. Contingent logic may be created such that the modified identifiers may act as logical operators. For example, a modified identifier having 2 added digits may indicate that no action is to be taken, while a modified identifier having 3 added digits may indicate an action, for example to send an email of a transaction even if no emails are usually sent. As such, a distributed trust model may result with different users holding a record and notifying certain users of a transaction.

According to one or more embodiments of the present disclosure, a user of a device may determine that a situation involving a risky transaction warrants generating and sending a distress signal to the remote server. In this regard, instead of just entering a specific identifier such as a modified or alternate identifier or gesture as described above according to one or more embodiments, the user may employ or rely on a distress signal such as a distress identifier or gesture to cause a defensive action. In various embodiments, the user may rely on a certain way to enter an identifier. For example, the user may enter an identifier at a certain overall speed, or use specific pauses while entering the identifier, or use specific pressure amounts, or press device interfaces such as keys for a certain length of time (e.g., for an extended time such as an extra 3 seconds), or simultaneously press more than one device interfaces such as keys, or use certain detectable gestures, etc.

In that regard, according to one or more embodiments, the device may include technologies capable of detecting the various ways of entering identifiers, for example, light sensors, accelerometers, time devices, etc. In other embodiments, the device may include one or more biometric information signature detectors adapted to detect user biometric information such as fingerprints, size of extremities (e.g., size of thumb, finger, etc.), retina information, etc. For instance, in an embodiment where the device includes a user interface having an input component that receives touch inputs, the size of a fingertip of the user may be considered in conjunction with biometric information signature. In an example, the user may use a thumb instead of a finger to enter information to cause the remote server to perform an action associated with receiving biometric information associated with the user's thumb.

Furthermore, other external data such as environmental data may be used to determine risk in connection with conducting a transaction. In one or more embodiments herein, the remote server and the user of the device may have pre-agreed upon certain specific identifiers or signals (e.g. modified or alternate identifiers such as the use of an extra digit, the way an identifier is entered, specific gestures, etc.) that indicate a risky transaction or a distress signal. But in addition, to determine risk in connection with a transaction, other external data at the time of the transaction may also be considered such as the time of day, location, hesitancy in entering digits or hesitancy in pushing interfaces such as buttons, gestures detected that are off by an amount of a degree, etc. This additional external data may not be pre-agreed upon, but may be considered to determine additional risk factors or be used as data points to enhance a risk model.

As a result of receiving a distress signal such as a distress identifier or gesture, the remote server may take a defensive action with respect to the transaction. Actions may include limiting the transaction to accessibility to a particular account or subaccount, locking down apps in a user device, limiting the transaction to a certain dollar amount, pulling funds from a certain account, turning on location tracking and/or a camera, alerting the authorities, etc.

In addition, according to various embodiments, the device may include an output device or component having a display component that may be customized based on a specific identifier such as a modified or alternate identifier or gesture, or a distress signal received from a user via a user interface. For example, the display component may be customized to show a different landing page than the normal landing page for a site or an account of the user, different profile pictures, a limited amount of available funds, limited personal information, e.g., no personal address, email or telephone numbers, etc. Also, a default view may be displayed differently to alert the user that a distress mode has been entered.

According to one or more embodiments of the present disclosure, a gradient of risk may be created. That is, in some embodiments, a user may alert the remote server that there is a potential risk with respect to a transaction, but the risk may be low such that the transaction should go through and be flagged and tracked, but it does not fail. In other embodiments, the user may alert the remote server that the risk is high such that the transaction should not go through. As such, the user may specify a risk gradient for a transaction. For instance, a user at an ATM may trigger tracking of a transaction or may go to an extreme such as terminating a transaction or having the authorities called depending on the specific identifier or gesture that the user enters. In an example, a user that is a victim of an attack such as mugging at an ATM may be forced to give out a PIN, and in this case, the user may give a PIN or enter the PIN in a certain way that is associated with a distress signal, which is received by a remote server and results in the remote server calling the authorities. In another example where the user is at the ATM, the user may enter, via a user interface of the ATM, a specific identifier such as a modified or alternate identifier or gesture, or may enter an identifier in a certain way that transmits a distress signal such that a display module of the ATM displays that the only available funds total $20. Preset information such as preset amounts may be determined and displayed in connection with certain specific identifiers, for example, the display may show that an amount of less than $500 is available if a certain modified identifier is entered or a certain gesture is detected. As such, the specific identifier such as a modified or alternate identifier or gesture may become a tool, not just a way for identification or authorization for a user.

In an embodiment, the user may have further control when using specific identifiers such as modified or alternate identifiers or gestures. For example, the user may control the identifier to set limits such as a time or a site limit. For instance, the user may create a temporary password that is valid only for a week when the user is out of town, or a temporary password for use during school, etc. In another instance, a user may use a modified identifier to access a subaccount. In this case, the user may type an identifier such as a password, and add a predetermined number of digits (e.g., 2 digits after the password such as "P4" (Password plus "P4")), then, as a result, a subaccount may be debited that includes a specific bucket of money such as a party fund where money that is especially set aside for the party is found.

Advantageously, according to one or more embodiments of the present disclosure, a user of a device may be empowered to use specific identifiers or signals to cause certain actions associated with the specific identifiers or signals, including: to create a gradient of risk in connection with a transaction such that the user may send an alert of a potentially risky transaction, or send a distress signal, or use the specific identifiers as a tool.

Figure 1:
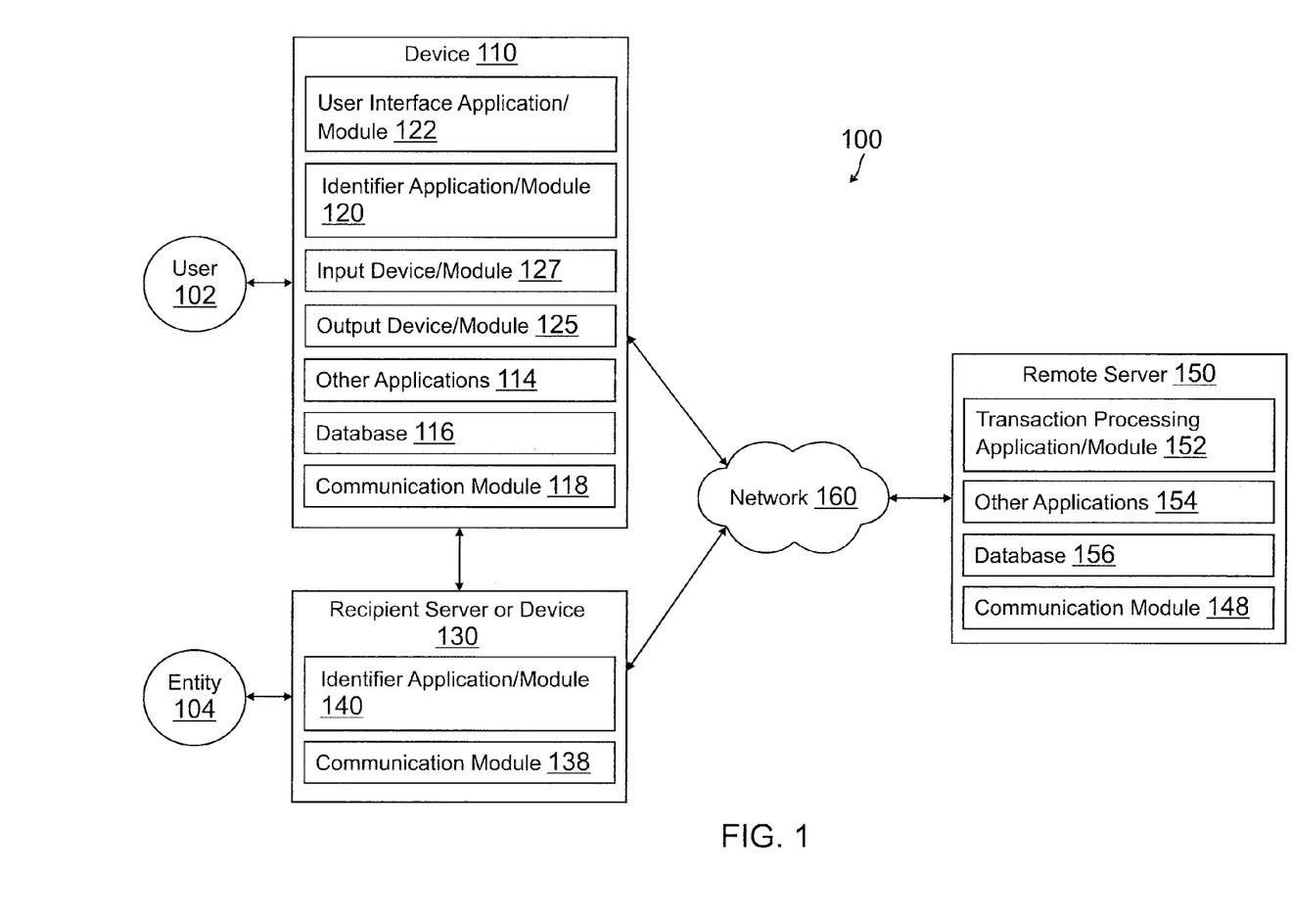
FIG. 1 is a block diagram of a networked system suitable for implementing one or more processes described herein, according to one or more embodiments of the present disclosure.

Referring now to the drawings wherein the showings are for purposes of illustrating embodiments of the present disclosure only, and not for purposes of limiting the same, FIG. 1 shows an embodiment of a block diagram of a networked system 100 suitable for implementing a process described herein according to one or more embodiments. Networked system 100 may be adapted for providing specific identifiers such as modified or alternate identifiers or gestures that are to be used in cases where, for example, recipients in a transaction are not trusted. In other embodiments, networked system 100 may be adapted for providing specific distress identifiers to cause a defensive action.

In various embodiments, system 100 may comprise or implement a plurality of devices, servers, and/or software components that operate to perform various methodologies in accordance with one or more described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

As illustrated in FIG. 1, the networked system 100 includes a device 110 (e.g., network computing device) that may be operated by a user 102, a recipient server or device 130 that is associated with an entity 104, and a remote server or device 150 (e.g., network server device) in communication over a network 160.

User 102 may utilize device 110 to engage in transactions such as financial, data or monetary transfers with recipient server or device 130 associated with entity 104. User 102 and entity 104 may utilize remote server 150 to complete the transactions between user 102 and entity 104.

Device 110, recipient server or device 130, and remote server 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Device 110 and recipient server or device 130 may be implemented using any appropriate hardware and software configured for wired and/or wireless communication between device 110, recipient server or device 130, and/or remote server 150. For example, in one embodiment, device 110 may be implemented as a user device (e.g., associated with user 102) including a personal computer (PC), a mobile device such as a smart phone, a laptop/tablet computer, a wristwatch with appropriate computer hardware resources, eyeglasses with appropriate computer hardware (e.g. GOOGLE GLASS®), other types of wearable computing devices, and/or other types of computing devices capable of transmitting and/or receiving data, such as an IPAD® from APPLE®. In some embodiments, where device 110 is implemented as a user device (e.g., associated with user 102) such as a mobile device, user 102 may interact with recipient server or device 130, for example, via a Point of Sale (POS) terminal or device or a website controlled by entity 104 associated with recipient server or device 130.

In other embodiments, device 110 may be implemented as an entity device that is managed or controlled by any suitable entity or other processing device (e.g., associated with entity 104). In this regard, where device 110 is implemented as an entity device, it may comprise a kiosk such as an ATM, a Point of Sale (POS) device such as a terminal at an entity's physical location or a website of an entity, or any other device having an interface wherein user 102 may interact or conduct transactions associated with recipient server or device 130. Although only one device 110 is shown interacting with recipient server or device 130, more than one, or a plurality of devices may function similarly.

Entity 104 may be any entity including a merchant, a financial institution, a non-profit organization, a subscription service, etc. However, there may be cases where certain fraudulent entities may impersonate, phish or otherwise try to conduct illegitimate transactions associated with a recipient server or device.

Device 110 and recipient server or device 130 may be used for engaging in transactions such as purchasing, bidding, transferring data or funds, etc. between user 102 and entity 104 associated with recipient server or device 130. For simplicity, any similar components of device 110 and recipient server or device 130 are discussed together with respect to FIG. 1. However, it is understood that implementations of device 110 and recipient server or device 130 may include the same, similar, and/or different components in various embodiments.

Device 110 includes a user interface application/module 122, an identifier application/module 120, an input device/module 127, an output device/module 125, other applications 114, a database 116, and a communication module 118. User interface application/module 122, identifier application/module 120, and other applications 114 may correspond to processes, procedures, and/or applications, for example, a software program, executable by a hardware processor. In other embodiments, device 110 may include additional or different software as required.

Device 110, in an embodiment, includes user interface application/module 122, which may be utilized by user 102 to conduct transactions (e.g., shopping, purchasing, bidding, withdrawing or depositing funds or items, etc.) with entity 104 associated with recipient server or device 130 or with remote server 150 over the network 160. In one aspect, purchase expenses may be directly and/or automatically debited from an account related to user 102 via the user interface application/module 122.

In one implementation, user interface application/module 122 comprises a software program, such as a graphical user interface (GUI), executable by a processor that is configured to interface and communicate with remote server 150 via the network 160. In another implementation, the user interface application/module 122 comprises a browser module that provides a network interface to browse information available over the network 160. For example, the user interface application/module 122 may be implemented, in part, as a web browser to view information available over the network 160. In another example, user 102 is able to access entity websites via the recipient server or device 130 to view and select applications, products, and/or services ("items") for purchase, and user 102 is able to purchase items from recipient server or device 130 via remote server 150. Accordingly, in one or more embodiments, user 102 may conduct transactions (e.g., purchase and provide payment for one or more items) from one or more entities associated with recipient server or device 130 via remote server 150. In yet another implementation, user interface application/module 122 may comprise a module that is utilized as part of a kiosk such as an ATM for interactions between user 102 and the kiosk including depositing or withdrawing funds or other items.

Identifier application/modules 120/140 may correspond to an application that stores identifier information for user 102 and entity 104 associated with recipient server or device 130, respectively. For example, where device 110 is a user device such as a mobile device of user 102, identifier application/module 120 may include identifier information associated with entity 104, while identifier application 140 may include identifier information associated with user 102/device 110. Thus, identifier application/module 120/140 provides an interface to identify, store, view, and utilize to transmit communications or conduct transactions between user 102 and entity 104. Such identifier application/module interface may be presentable to user 102 through an output device/module 125 of device 110, such as a display module. Identifier application/module 120/140 may store identification or security information to a non-transitory memory of user device 110/recipient server or device 130 in the form of user account numbers, passwords, PINs, names, addresses, phone numbers, email addresses, user account names, or other information. The identification or security information may be sufficient to allow user 102 to be identified such that communications or transactions with entity 104 associated with recipient server or device 130 may be conducted. In various embodiments where remote server 150 comprises a payment provider server, the identification or security information may have identifying information for a payment account with the remote server 150.

In an embodiment, identifier application/module 120/140 may receive identifier information, for example in connection with a payment account/financial information, etc., from user 102 using an input device/module 127 via user interface application/module 122 of device 110. The identifier information may be transmitted or communicated via a communication module 118 and received via a communication module 138 of recipient server or device 130 and/or a communication module 148 of remote server 150.

In addition to displaying identifier information (e.g., a user account name or a password that may or may not be displayed in an encrypted form) via output device/module 125, identifier application/module 120/140 may also display information or details about a transaction. According to embodiments herein, identifier application/module 120 of device 110 may include processes that may be executed to allow user 102 to enter or input specific identifier information such as modified or alternate identifier information including gestures using input device 127 via user interface application/module 122 of user device 110, display identifier or transaction information or details on output device 125 of user device 110, and communicate/transmit information via communications module 118.

In various embodiments, device 110 may include or be a part of any device that includes input device 127, which may be adapted to receive inputs comprising identifier information from user 102 in various ways, for example, via a touch screen, a keyboard, a keypad, gesture recognition, audio or voice recognition, etc. As such, in some embodiments, input device 127 includes non-touch gesture recognition, that is, where non-touch gestures may generally be captured by sensors or technologies other than touch screen gesture interactions. For example, non-touch gesture recognition may be done via ultrasonic gesture detection, image or video capturing components such as a camera, depth sensor, IR, ultrasonic pen gesture detection, etc. Input device 127 may comprise vision-based gesture capabilities that use cameras or other image tracking technologies to capture a user's gestures without touching the device (i.e., non-touch gestures such as a hand pose in front of a camera), or may have capabilities to detect non-touch gestures other than vision-based capabilities.

As such, user 102 may enter information, including identifier information along with any transaction details via input device 127, and the entered information may be received by entity 104 via communication module 138 of recipient server or device 130. Also, specific identifier information such as modified or alternate identifier information, along with any transaction details, may be received by remote server 150 via communication module 148 of remote server 150. In that regard, the modified or alternate identifier information may alert remote server 150 to flag or keep track of a transaction associated therewith, or to take another action as will be described in more detail below according to one or more embodiments.

In situations where user 102 does not trust, or may be suspicious of entity 104 associated with recipient server or device 130, identifier application/module 120 may correspond to one or more processes to execute modules of device 110 to provide a convenient interface in identifier application/module 120 to provide an option or permit user 102 to enter or input a specific identifier such as a modified or alternate user identifier in connection with a transaction. Identifier application/module 120 may utilize specialized hardware and/or software of user device 110 to determine whether identifier information associated with a transaction is modified or alternate so that an action may be determined, for example, whether the modified or alternate identifier is sufficient to initiate a transaction with entity 104, or if the modified or alternate identifier may indicate that the transaction should be terminated, or if output device/module 125 should modify a display, or any other action based on the received identifier information.

As such, identifier application/module 120 may utilize identifier information to find an account with remote server 150 or another financial account. Identifier application/module 120 may also provide an option for a user to enter a specific identifier such as a modified or alternate identifier or gesture, which may be used to identify the user in a transaction. In cases where user 102 decides to use the option to use a specific identifier, user 102 may use input device 127 of device 110 to input information into an identifier field. In an embodiment, identifier application/module 120 may auto-populate the identifier field with an identifier for user 102 stored to device 110, such as a name, a device identifier, an encoded password or PIN, and/or payment account identifier/information. The identifier information along with any transaction information such as payment account information may be stored by identifier application/module 120 with user device 110, for example in database 116. Thus, identifier application/module 120 may access database 116 to retrieve the identifier information and enter it in an identifier field. Once user 102 has entered identifier information, identifier application/module 120 may initiate, where appropriate, a transaction by a communication to recipient server or device 130 and/or remote server 150. In an embodiment, identifier application/module 120 may also cause a digital wallet to be identified and displayed by device 110, where user 102 may select a payment instrument for use in the transaction and/or manage previous transactions.

As such, in an example, if user 102 wishes to initiate a transaction with entity 104, but user 102 suspects that entity 104 is not to be trusted; user 102 may enter specific identifier information such as a modified identifier in identifier application/module 120 via input device 127, and cause communication module 118 of device 110 to communicate the specific identifier information to remote server 150 over network 160. Furthermore, in some embodiments, identifier information may be communicated to remote server 150 for retrieval by receiver server or device 130 when receiver server or device 130 accesses user 104's account with remote server 150.

Device 110 may include other applications 114 as may be desired in particular embodiments to provide features to device 110. For example, other applications 114 may include security applications for implementing client-side security features, programmatic client applications for interfacing with appropriate application programming interfaces (APIs) over network 160, or other types of applications. In embodiments where device 110 is implemented by a user device, other applications 114 may also include email, texting, voice and IM applications that allow a user to send and receive emails, calls, texts, and other notifications through network 160. In various embodiments, other applications 114 may include financial applications, such as banking, online payments, money transfer, or other applications associated with remote server 150. Other applications 114 may include browser applications enabling device 110 to access websites and/or receive information from one or more online sources or from entity 104 via recipient server or device 130. Additionally, other applications 114 may include social networking/media applications, including microblogging applications. Other applications 114 may contain other software programs, executable by a processor, including a graphical user interface (GUI) configured to provide an interface to the user.

Database 116 of device 110 may include, for example, identifiers such as operating system registry entries, cookies associated with identifier application/module 120 and/or other applications 114, identifiers associated with hardware of device 110, or other appropriate identifiers, such as identifiers used for transaction/user/device authentication or identification. In one embodiment, identifiers in database 116 may be used by recipient server or device 130 and/or a payment provider for example associated with remote server 150, to associate device 110 with a particular account maintained by entity 104 and/or remote server 150.

In various embodiments, database 116 may further include user information data to access user accounts, such as payment account information for a payment account with remote server 150. Thus, database 116 may include user personal information (e.g. a name, social security number, user financial information, or other identifying information), a user account identifier, and a user device identifier. In various embodiments, database 116 may include online account access information. Database 116 may also store identifier information and/or transaction information, including transaction histories such as financial transactions. Database 116 may include transaction histories stored for later use.

In various embodiments, device 110 includes at least one communication module 118 adapted to communicate with receiver server or device 130 via communication module 138 and/or remote server 150 via communication module 148 over network 160 and/or directly. Thus, communication module 118/138/148 may include a DSL (e.g., Digital Subscriber Line) modem, a PSTN (Public Switched Telephone Network) modem, an Ethernet device, a broadband device, a satellite device and/or various other types of direct wired and/or wireless network communication devices including microwave, radio frequency, infrared, Bluetooth, and near field communication components. Communication module 118/138/148 may communicate directly with another nearby device using short range communications, such as Bluetooth Low Energy, LTE Direct, radio frequency, infrared, Bluetooth, and near field communications. Thus, communication module 118/138/148 may include various specialized short range communication modules that may connect with nearby devices.

Remote server 150 may be maintained, for example, by an online payment service provider, which may provide payment service to a user. Also, remote server 150 includes one or more processing applications, which may provide specific identifiers or gestures that correspond to an action, for example, that are to be used in cases where recipients in a transaction are not trusted. In one example, remote server 150 may be a payment provider server provided by PAYPAL®, Inc. or eBay®, Inc. of San Jose, Calif., USA. In other embodiments, remote server 150 may be maintained by or include a merchant, financial services provider, and/or other service providers, which may provide identifier services to user 102. Remote server 150 may additionally provide use of accounts for use in connection with one or more transactions.

Remote server 150 of FIG. 1 includes a transaction processing application 152, other applications 154, a database 156, and a communications module 148. Transaction processing application 152 and other applications 154 may correspond to processes, procedures, and/or applications executable by a hardware processor, for example, a software program. In other embodiments, remote server 150 may include additional or different software as required.

Transaction processing application 152 may execute one or more modules of remote server to receive and/or transmit information between device 110 and recipient server or device 130 for processing and completion of transactions between user 102 and entity 104 such as payments. In various embodiments, transaction processing application 152 may include one or more applications to process a specific identifier such as a modified or alternate identifier or gesture entered by user 102 in connection with a transaction with entity 104. In that regard, received identifier information may be compared to identifiers that have been pre-agreed upon between user 102 and remote server 150, as set forth, for example, in Table 1 of FIG. 2, which will be described in more detail below according to one or more embodiments. Based on the comparison, the remote server may take an action that corresponds to the received identifier information. For example, transaction processing application 152 may flag and track the transaction with entity 104 as a result of receiving the specific identifier entered by user 102. Remote server 150 may complete the transaction (for example, it may credit and post a payment amount to an account of entity 104), but may keep track of the transaction, for example, for a predetermined amount of time such as one month from the time of the transaction to determine that payment is confirmed. In other embodiments, depending on the received specific identifier entered by user 102, remote server 150 may terminate the transaction or perform a defensive action as in a distress situation. Additionally, transaction processing application 152 may cause database 156 to store transaction histories, including receipts to complete or retain a history of the transactions.

In various embodiments, remote server 150 includes other applications 154 as may be desired in particular embodiments to provide features to remote server 150. For example, other applications 154 may include security applications for implementing server-side security features, programmatic server applications for interfacing with appropriate application programming interfaces (APIs) over network 160, or other types of applications. Other applications 154 may contain software programs, executable by a processor, including a graphical user interface (GUI), configured to provide an interface to a user.

Additionally, remote server 150 includes a database 156. As previously described, user 102 may establish one or more user accounts with remote server 150. User accounts in database 156 may include user identifiers in connection with one or more recipients, for example, respective passwords, PINs, user names, user account numbers, and the like. Also, in various embodiments, database 156 may store pre-agreed upon specific identifiers that include specific identifier modifications or gestures, which correspond to certain respective actions. For example, specific identifiers that may be pre-determined to be used in connection with recipients that may not be trusted.

In addition, user accounts in database 156 may include user information, such as name, address, birthdate, payment/funding information, additional user financial information, and/or other desired user data.

User 102 and entity 104 may link user and entity recipient accounts to device 110 and recipient server or device 130 through a device identifier. Thus, when a device identifier corresponding to device 110 or recipient server or device 130 is transmitted to remote server 150, e.g. from device 110 and/or recipient server or device 130, an account belonging to user 102 and/or entity 104 may be found. Database 156 may further store transaction details corresponding to user 102 and/or entity 104 and/or transaction history for completed transactions.

In various embodiments, remote server 150 includes at least one communication module 148 adapted to communicate with network 160 including device 110 and/or recipient server or device 130. In various embodiments, communication module 158 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

As described above according to one or more embodiments, a user of a device may have an account, which is stored in a database maintained by the remote server. The user and the remote server may enter into a pre agreement to determine or set up specific identifiers such as modified or alternate identifiers or gestures for use in situations that the user perceives to be risky. For example, a modified identifier may be a password with two digits or characters added either at the beginning or at the end of the password, which may correspond to flagging and tracking a transaction. Also, a gesture may be added such as a hand signal or a key pressure for a certain amount of time.

Figure 2:
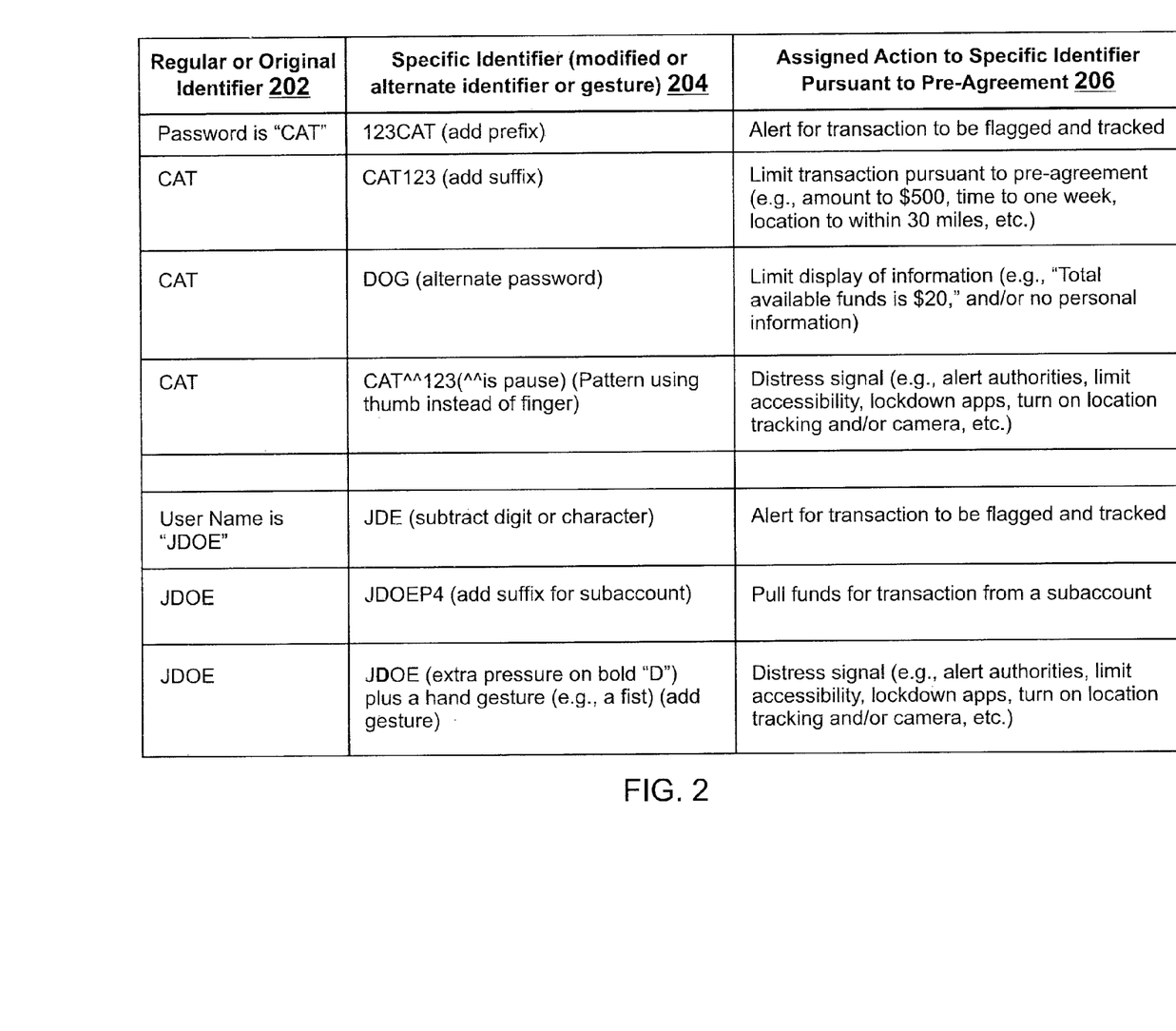
FIG. 2 is an exemplary Table 1 illustrating specific identifiers with corresponding actions, according to one or more embodiments of the present disclosure.

FIG. 2 illustrates a Table 1 showing examples of specific identifiers with corresponding actions. Table 1 may be stored in database 156 of remote server 150 and it may include one or more identifiers or gestures with corresponding actions that have been pre-agreed upon by a user of a device and a remote server. In Table 1 of FIG. 2, a column 202 shows examples of regular or original identifiers (e.g., normal passwords or user names), a column 204 shows examples of specific identifiers related to the regular or original identifiers listed in column 202, and column 206 shows examples of actions assigned to the specific identifiers listed in column 204.

For example, in column 202, a regular or original identifier may be a password "CAT," but when a modified password is received having an added prefix such as "123CAT" (as shown in column 204), the modified password indicates an alert for the transaction to be flagged and tracked due to a high risk designation (as shown in column 206). In the same manner going down columns 204 and 206, when the regular password "CAT" has an added suffix such as "CAT123", the modified password indicates that the transaction should have limits such as up to an amount of $500, for a period of one week, or within a 30 mile area. When the regular password "CAT" is substituted by an alternate password "DOG", the alternate password indicates that a device should display minimal information (e.g., no personal information) or that there is a minimum amount of total available funds. When the regular password "CAT" and a pattern is detected, for example, the regular password "CAT" is followed by a pause and then a suffix "123" and also the user uses a thumb instead of a finger to enter the password, the modified identifier entered in a certain pattern as well as biometric information related to the user's thumb may indicate a distress signal, which results in a pre-agreed action such as limiting accessibility, alert authorities, lockdown apps in a user device, turn on location tracking and/or camera, etc.

In another example with respect to Table 1 of FIG. 2, a username "JDOE" may be modified by subtracting one or more digits or characters at the beginning or the end of the username. For example, username "JDOE" may have a subtracted character "O", which then becomes "JDE". This modified user name may send an alert to flag and track a transaction. In another example, username "JDOE" may have an added suffix "P4" such as "JDOEP4", which may indicate that funds for a transaction should be pulled from a subaccount, for example, funds for the transaction should be pulled from a party fund set up for a special occasion party. In yet another example where user name "JDOE" is entered such that extra pressure is applied on the character "D" plus a gesture is also entered, for example, a hand gesture such as a fist, this may indicate a distress signal. It should be appreciated that the examples of Table 1 in FIG. 2 are for illustrative purposes only, and there may be many ways or combinations of specific identifiers and/or ways to enter identifiers that are within the scope of the present disclosure in order cause an action such as alerting the remote server to flag or track a transaction, sending a distress signal, etc. For example, adding a suffix to a password or an account number may indicate a distress signal, or entering identifier information with a thumb instead of a finger may indicate a limitation of funds during a vacation, etc.

Figure 3:
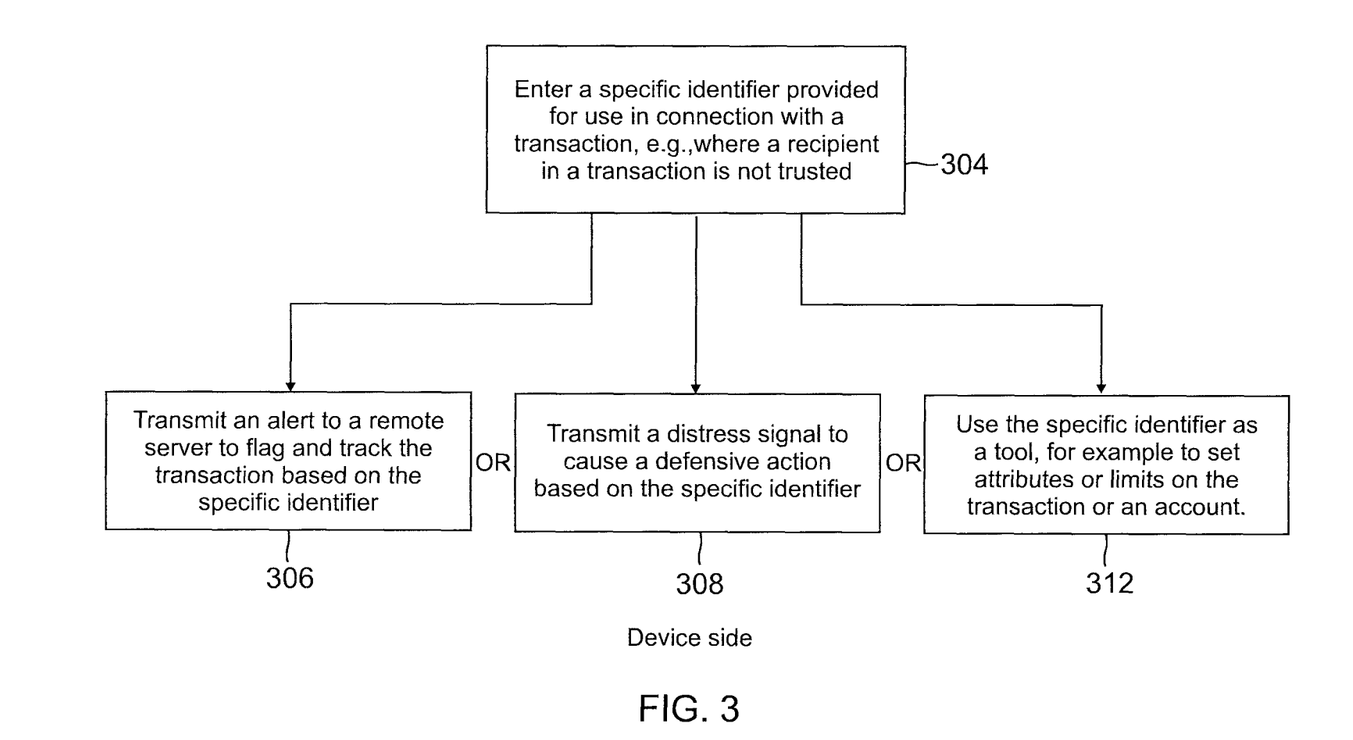
FIG. 3 is a flow diagram illustrating a method for providing specific identifiers for certain transactions from a device side, according to one or more embodiments of the present disclosure.
Figure 4:
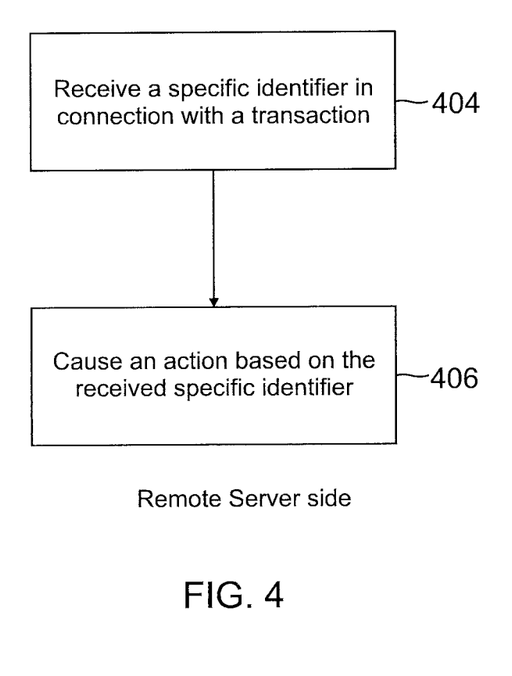
FIG. 4 is a flow diagram illustrating a method for providing specific identifiers for certain transactions on a remote server side, according to one or more embodiments of the present disclosure.

Referring now to FIG. 3, a flow diagram is shown illustrating a method for providing specific identifiers for certain transactions from a device side, according to one or more embodiments of the present disclosure. FIG. 4 is a flow diagram illustrating a method for providing specific identifiers for certain transactions from a remote server side, according to one or more embodiments of the present disclosure. The methods illustrated in FIGS. 3 and 4 may be implemented by the system illustrated in FIG. 1 according to an embodiment. Also, it should be noted that one or more steps, processes, and methods described herein may be omitted, performed in a different sequence, or combined as desired or appropriate.

In the embodiment illustrated in FIGS. 3 and 4, a process for providing specific identifiers to cause an action may occur between a device side and a remote server side. As described above according to one or more embodiments, a user of a device may have an account with a remote server wherein the user and the remote server have a pre-agreement to use specific identifiers to cause certain actions by the remote server with respect to one or more transactions. For example, the user may enter specific identifiers that are pre-agreed upon in cases where a recipient entity in a transaction is not trusted.

In block 304 of FIG. 3, when a user that may wish to conduct a transaction with an entity or a recipient, for example via a device such as a user device or a kiosk (e.g. ATM, a vending device, etc.), the device may be adapted to receive user inputs including user identifier information such as a user name, a password, a PIN, a user account number, gestures, biometric information, etc. For example, in an embodiment where the user does not trust a recipient in a transaction to receive the user's inputs or information, the user may have an option to enter a specific identifier such as a modified or alternate identifier or gesture.

In blocks 306, 308 and 312, a certain action may be caused based upon the user entering a specific identifier. Specifically, in block 306, the device is adapted to transmit an alert to a remote server to flag and track the transaction based on the specific identifier entered by the user of the device. For example, the user may enter a modified password having two extra digits at the end of the password. Such modified password may correspond to a pre-agreed upon password that causes transmission of an alert to the remote server to flag the transaction for tracking due to the high risk designation.

Or, as in block 308, upon the user entering a specific identifier, the device is adapted to transmit a distress signal to the remote server to cause a defensive action based on the specific identifier. For example, the user may enter a password in a certain pattern (for example, with specific pauses or pressure amounts) or with certain gestures. Such specific identifiers or gestures may cause the remote server to terminate the transaction immediately, limit accessibility to an account, lockdown apps in a user device, turn on location tracking and/or camera, alert the authorities, etc. In other embodiments, a distress signal may cause the device to customize a display component to show a different landing page, different profile pictures, limited account attributes such as a minimal amount of available funds in an account, etc. A default view may also be displayed that is different to alert the user that the distress mode has been entered.

Or, as in block 312, the user may enter a specific identifier on the device such that the specific identifier is used as a tool instead of just for identification or security purposes. For example, a specific identifier may be set up to correspond to certain attributes or limits for a transaction or an account such as time limits when a transaction may occur (e.g., for a limited vacation time), or for certain locations (e.g., on a school campus). In other examples, a specific identifier may be set up to correspond to certain subaccounts such than when the corresponding specific identifier is entered, funds for a transaction may be pulled from the corresponding subaccount.

Referring now to FIG. 4, in block 404, on the remote server side, the remote server receives the specific identifier that is entered by a user on a device in connection with the transaction. As described above according to one or more embodiments, the remote server may maintain a database having user accounts including information on pre-agreements between a user and the remote server assigning certain specific identifiers such as modified or alternate identifiers or gestures to corresponding actions.

In block 406, upon receiving a specific identifier in connection with a transaction, the remote server may cause an action based on the received specific identifier. For example, the remote server may flag and track a transaction, or may cause a defensive action when the specific identifier indicates a distress situation, or may impose limits on the transaction or account.

Figure 5:
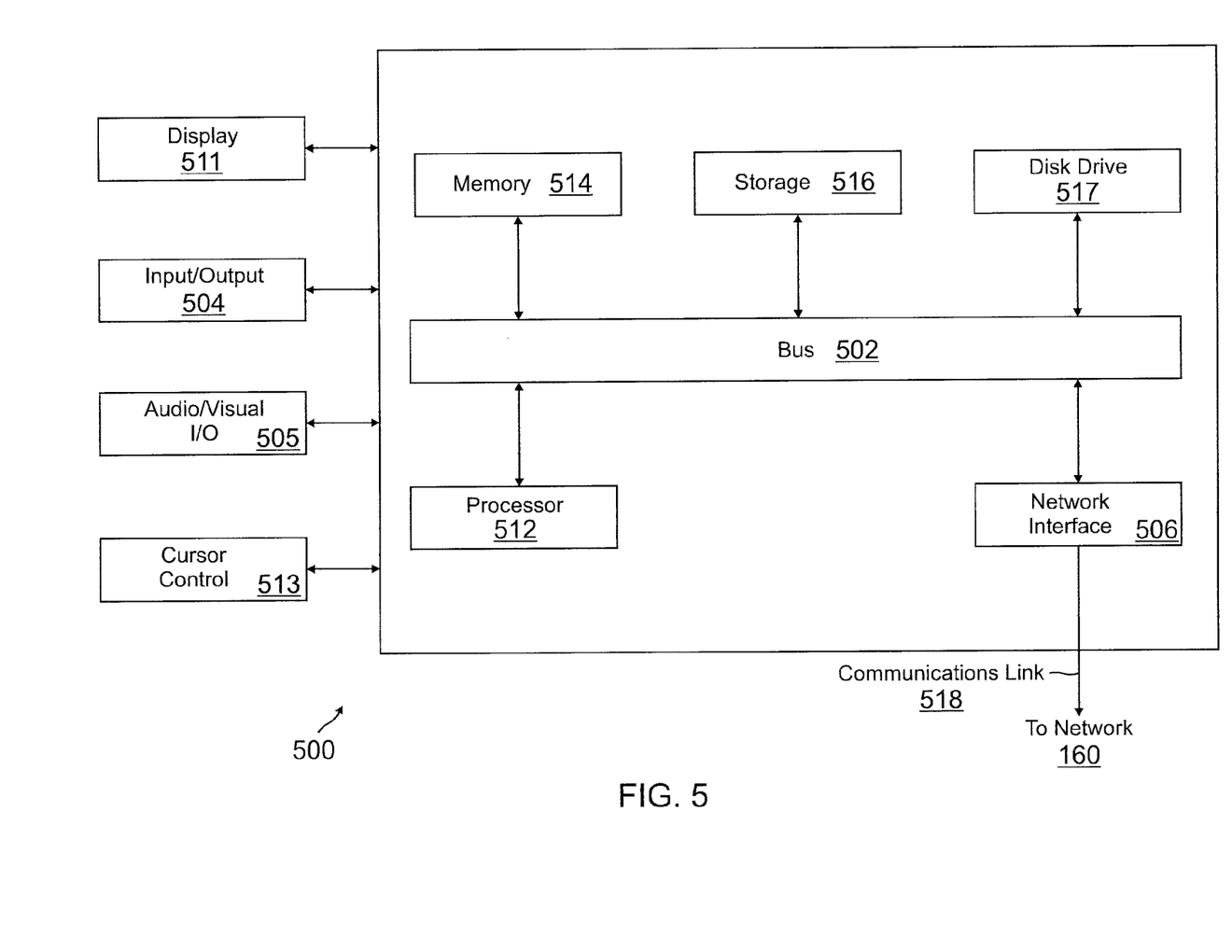
FIG. 5 is a block diagram of a computer system suitable for implementing one or more components in FIG. 1, according to one or more embodiments of the present disclosure.

FIG. 5 is a block diagram of a computer system suitable for implementing one or more components in FIG. 1, according to an embodiment. In various embodiments, a device may comprise a user computing device (e.g., smart phone, a computing tablet, a personal computer, laptop, PDA, Bluetooth device, key FOB, badge, etc.) capable of communicating with the network. In other embodiments, the device may comprise a device managed or controlled by a recipient or entity (e.g., a kiosk such as an ATM, vending device, etc.). The recipient server or device and/or remote server may utilize a network computing device (e.g., a network server) capable of communicating with the network. It should be appreciated that each of the devices utilized by users, recipients and/or service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting interfaces such as keys from a keypad/keyboard, one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio/visual input/output component 505 may also be included to allow a user to use gestures, audio, or voice for inputting information by converting associated signals. Audio/visual I/O component 505 may also allow the user to hear audio. Also, one or more biometric information signature detectors may be implemented as part of I/O component 504 or 505 for detecting user biometric information. A transceiver or network interface 506 transmits and receives signals between computer system 500 and other devices, such as another device, a recipient device, or a remote server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

The invention claimed is:

1. A distress identification system comprising:
a non-transitory memory storing a database that includes information associated with a plurality of first identifiers and information associated with a plurality of second identifiers, wherein the information associated with the plurality of first identifiers is used for transactions with trusted third-party entities and the information associated with the plurality of second identifiers is used for transactions with untrusted third-party entities, and wherein the information associated with the plurality of second identifiers corresponds to one or more defensive actions that are executed based on the information associated with the plurality of second identifiers; and
one or more hardware processors that execute instructions to cause the system to perform operations comprising:
receiving, from a user via a user input device, information associated with one of the second identifiers in connection with conducting a transaction with an untrusted third-party entity via the device, wherein the information associated with one of the second identifiers identifies one or more first defensive actions;
associating the one or more first defensive actions with the transaction in order to track the transaction as the transaction is processed by a payment service provider;
monitoring each step of the transaction as the transaction is processed by the payment service provider to determine whether any conditions of the one or more first defensive actions are met; and upon the transaction meeting a condition of one of the associated defensive actions, executing the at least one associated defensive action.

2. The system of claim 1, wherein the operations further comprise: comparing the information received from the input device to a corresponding defensive action, wherein the information comprises a way for the user to enter the one or more first defensive actions via the input device.

3. The system of claim 1, wherein the operations for receiving the information includes receiving inputs from the user via the input device, the inputs comprising at least one of an overall speed of entering the information, using one or more specific pauses in entering the information, using a specific pressure amount, pressing device interfaces for a certain length of time, simultaneously pressing more than one device interface on the input device, or entering certain detectable gestures.

4. The system of claim 1, wherein the operations for receiving information includes receiving biometric information signature detection.

5. The system of claim 4, wherein the operations for receiving the information includes receiving a biometric information signature and processing the biometric information signature in performing a corresponding defensive action.

6. The system of claim 1, wherein the operations for executing the at least one defensive action further comprises at least one of limiting accessibility to an account or sub-account of the user in connection with the transaction, limiting the transaction to a certain amount, pulling funds from a certain account or subaccount, locking down apps in the device, turning on location tracking of the device, turning on a camera of the device, or alerting authorities.

7. The system of claim 1, wherein the operations further comprise: outputting, to a user interface of the input device, parameters based on the information received in connection with the transaction.

8. The system of claim 7, wherein the operations for outputting the parameters includes showing at least one of a different landing page than a normal landing page for a site or an account of the user, one or more different profile pictures, a limited amount of available funds, or limited personal information.

9. The system of claim 7, wherein the operations for outputting the parameters includes showing a default view that is different than a normal default view to alert the user that a distress mode has been entered.

10. The system of claim 1, wherein the operations for executing the at least one defensive action is based at least in part on external data associated with the conducting of the transaction.

11. The system of claim 10, wherein the external data at a time of the transaction further comprises at least one of time of day, a location, hesitancy of the user in entering digits or hesitancy of the user in pushing interfaces on the input device, or entering gestures at an off angle.

12. The system of claim 1, wherein the operations further comprise storing signals that are pre-agreed upon, which the user inputs via the input device to indicate distress, the signals comprising one or more modified or alternate identifiers, a way to enter one or more identifiers, or one or more specific gestures.

13. The system of claim 1, wherein the information further comprises one or more detectable gestures entered by the user via a gesture detector of the device including an image or video capturing device.

14. The system of claim 1, wherein the input user device comprises a computing device capable of transmitting and/or receiving data including a personal computer (PC), a mobile device including a smart phone, a laptop/tablet computer, one or more wearable devices including a wristwatch with appropriate computer hardware resources or eyeglasses with appropriate computer hardware.

15. The system of claim 1, wherein the input device comprises a device controlled or managed by an entity wherein the user interacts with the entity in connection with the transaction, the device further comprising a kiosk, a Point of Sale (POS) terminal or device or a website associated with the entity.

16. The system of claim 1, wherein the input device comprises at least one of an accelerometer, a light sensor, gesture recognition, a biometric information signature detector, or audio or voice recognition used for detecting a distress signal in connection with the transaction.

17. A method comprising:
accessing, on a non-transitory memory, a database that includes information associated with a plurality of first identifiers and information associated with a plurality of second identifiers, wherein the information associated with the plurality of first identifiers is used for transactions with trusted third-party entities and the information associated with the plurality of second identifiers is used for transactions with untrusted third-party entities, and wherein the information associated with the plurality of second identifiers corresponds to one or more defensive actions that are executed based on the information associated with the plurality of second identifiers;
receiving, by a communication module of a remote server, information associated with one of the second identifiers entered by a user via an input device in connection with conducting a transaction with a untrusted third-party entity via the device, wherein the information associated with one of the second identifiers identifies one or more first defensive actions;
associating the one or more defensive actions with the transaction in order to track the transaction as it is processed by a payment service provider; and
monitoring each step of the transaction as it is processed by the payment service provide to determine whether any conditions of the one or more first defensive action are met; and
upon the transaction meeting a condition of the defensive action, executing, by at least one hardware processor in communication with the non-transitory memory and the communication module, the defensive action corresponding to the information.

18. The method of claim 17, wherein the executing the defensive action by the at least one or more hardware processors further comprises accessing external data at a time of the transaction in addition to pre-agreed specific distress identifier information.

19. The method of claim 17, wherein the specific distress identifier information is received from the user of the device using technologies capable of detecting one or more ways of entering the specific distress identifier information.

20. A non-transitory machine-readable medium having stored thereon machine-readable instructions executable to cause a machine to perform operations comprising:
accessing, on a non-transitory memory, a database that includes information associated with a plurality of first identifiers and information associated with a plurality of second identifiers, wherein the information associated with the plurality of first identifiers is used for transactions with trusted third-party entities and the information associated with the plurality of second identifiers is used for transactions with untrusted third-party entities, and wherein the information associated with the plurality of second identifiers corresponds to one or more defensive actions that are executed based on the information associated with the plurality of second identifiers;

receiving, by a communication module of a remote server, information associated with one of the second identifiers entered by a user via an input device in connection with conducting a transaction with a untrusted third-party entity via the device, wherein the information associated with one of the second identifiers identifies one or more first defensive actions;

associating the one or more defensive actions with the transaction in order to track the transaction as it is processed by a payment service provider; and monitoring each step of the transaction as it is processed by the payment service provide to determine whether any conditions of the one or more first defensive action are met; and upon the transaction meeting a condition of the defensive action, executing, by at least one hardware processor in communication with the non-transitory memory and the communication module, the defensive action corresponding to the information.

* * * * *